(12) United States Patent
Suozzi, Jr.

(10) Patent No.: US 9,456,537 B2
(45) Date of Patent: Oct. 4, 2016

(54) RING DEVICE

(71) Applicant: Vincent A. Suozzi, Jr., Glen Cove, NY (US)

(72) Inventor: Vincent A. Suozzi, Jr., Glen Cove, NY (US)

(*) Notice: Subject to any disclaimer, the term of this patent is extended or adjusted under 35 U.S.C. 154(b) by 0 days.

(21) Appl. No.: 14/140,049

(22) Filed: Dec. 24, 2013

(65) Prior Publication Data

US 2014/0209336 A1 Jul. 31, 2014

Related U.S. Application Data

(60) Provisional application No. 61/849,350, filed on Jan. 25, 2013.

(51) Int. Cl.
*A01B 1/16* (2006.01)

(52) U.S. Cl.
CPC ........................................ *A01B 1/16* (2013.01)

(58) Field of Classification Search
CPC .................................................... A44C 9/0053
USPC ...... 172/370, 371, 378; 63/1.12, 15; 30/232, 30/298
See application file for complete search history.

(56) References Cited

U.S. PATENT DOCUMENTS

| | | | | |
|---|---|---|---|---|
| 384,635 A * | 6/1888 | Maynard | ................. | 172/370 |
| 467,364 A * | 1/1892 | Breen | ................. | 294/25 |
| 825,073 A * | 7/1906 | Reed | ................. | B26B 27/007 |
| | | | | 15/236.01 |
| 909,018 A * | 1/1909 | Paxton | ................. | A01B 1/00 |
| | | | | 172/370 |
| 1,035,008 A * | 8/1912 | Hendrick | ................. | A47J 25/00 |
| | | | | 294/25 |
| 1,155,931 A * | 10/1915 | Keebaugh | ................. | 30/298 |
| 1,184,710 A * | 5/1916 | Baumann | ................. | 83/860 |
| 1,340,419 A * | 5/1920 | Schrage | ................. | 30/123.5 |
| 1,559,839 A * | 11/1925 | Asher | ................. | 30/298 |
| 1,675,240 A * | 6/1928 | Asher | ................. | 30/298 |
| 1,985,674 A * | 12/1934 | Bauer | ................. | A01B 1/00 |
| | | | | 172/370 |
| D136,947 S * | 1/1944 | Brittingham | ................. | D8/3 |
| 2,409,101 A * | 10/1946 | Brittingham | ................. | 2/21 |
| D163,769 S * | 6/1951 | Robinson | ................. | D8/3 |
| 3,674,035 A * | 7/1972 | Edmiston | ................. | 30/121.5 |
| 4,467,873 A * | 8/1984 | Kaatz | ................. | 172/370 |
| 4,474,246 A * | 10/1984 | Arroyo | ................. | 172/370 |

(Continued)

*Primary Examiner* — Matthew D Troutman
(74) *Attorney, Agent, or Firm* — Scully, Scott, Murphy & Presser, P.C.

(57) ABSTRACT

A ring device including a sheath, wherein the sheath extends partially around a circumference, creating a gap, the gap extending from a proximal end of the sheath to a distal end of the sheath, the circumference configured to extend around a portion of a user's finger and an elongated portion, wherein a proximal end of the elongated portion is operably connected to a portion of the sheath, and a distal end of the elongated portion includes one or more notches formed in a distal edge of the distal end of the elongated portion and wherein the elongated portion includes a substantially flat portion and a substantially curved portion, wherein the substantially flat portion is distal to the substantially curved portion, wherein a portion of the one or more notch faces are formed in the substantially curved surface and the substantially curved surface is wider than the substantially flat portion.

5 Claims, 8 Drawing Sheets

(56) References Cited

U.S. PATENT DOCUMENTS

| | | | | |
|---|---|---|---|---|
| 4,765,208 A | * | 8/1988 | Sakosky | B67B 7/403 |
| | | | | 81/3.55 |
| 4,797,974 A | * | 1/1989 | Smith, Jr. | A22C 25/06 |
| | | | | 294/25 |
| 5,042,778 A | * | 8/1991 | Szazy | 254/132 |
| 5,357,680 A | * | 10/1994 | Monistere | 30/298 |
| D373,225 S | * | 8/1996 | Theroux et al. | D29/114 |
| 5,609,325 A | * | 3/1997 | DeArmond | 254/132 |
| 5,871,245 A | * | 2/1999 | Fligg | A23G 3/50 |
| | | | | 294/25 |
| D414,300 S | * | 9/1999 | Silvey | D29/114 |
| D415,321 S | * | 10/1999 | Silvey | D29/114 |
| 6,010,170 A | * | 1/2000 | Fligg | A23G 3/28 |
| | | | | 294/25 |
| 8,381,313 B2 | * | 2/2013 | Logan | A41D 13/087 |
| | | | | 2/21 |

* cited by examiner

RING DEVICE

FIELD OF THE DISCLOSURE

The disclosure relates generally to the field of ring devices. More specifically, the present disclosure is directed to ring devices, and ring like devices that can be worn on a user's hand.

BACKGROUND OF THE DISCLOSURE

Many tools for use in controlling or interacting with vegetation around a house or on a large scale are cumbersome, heavy and/or difficult to operate. Because of this lack of ease of use, controlling or interacting with vegetation around a house or on a large scale becomes difficult.

What is desired is a device that overcomes the disadvantages of prior tools by being controllable with a user's hand.

Embodiments of the present application provide a system that addresses the above and other issues.

SUMMARY OF THE DISCLOSURE

The present application is directed towards ring devices. The ring device includes a sheath and an elongated portion that is operably connected to the sheath.

BRIEF DESCRIPTION OF THE DRAWINGS

The present disclosure will be better understood by reference to the following drawings of which.

DETAILED DESCRIPTION

Figure 1:
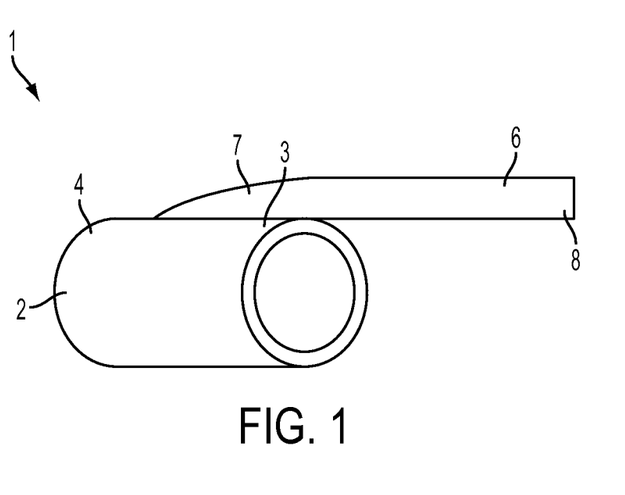
FIG. 1 is a plan view of a ring device.

The present application is directed towards a ring device 1, as illustrated in FIG. 1. FIG. 1 illustrates a plan view of the ring device 1. Ring device 1 includes a sheath 2 and an elongated portion 6. The sheath 2 is configured to extend at least partially around a circumference, wherein the circumference is capable of extending around a portion of a user's finger. The portion of the user's finger can be any portion of any finger on the user's left or right hand. A proximal end 7 of elongated portion 6 is operably connected to a portion of the sheath 2. Elongated portion 6 can also be integrally formed with sheath 2. The proximal end 7 of elongated portion 6 can be operably connected to the sheath 2 in an area of a distal end 3 of the sheath 2 or the elongated portion 6 can be operably connected to the sheath 2 from the distal end 3 along the sheath 2 towards a proximal end 4 of the sheath 2.

As illustrated in FIG. 1, elongated portion 6 is shown as being substantially flat, but elongated portion 6 can be formed at an angle or be formed as part of a curve that extends vertically above or below the distal end 3 of sheath 2 and can be formed at any suitable thickness. As illustrated in FIG. 1, sheath 2 is shown as being substantially circular, but sheath 2 can be any other suitable shape that is capable of fitting around a portion of a user's finger, such as an eccentric shape or an oval shape, for example. Sheath 2 can also include a cover (not shown) over the opening in the distal end 3 of sheath 2, so that a user's finger does not protrude through sheath 2.

Elongated portion 6 and sheath 2 can be formed of any suitable material, such as, for example, a metal or plastic material.

Figure 2:
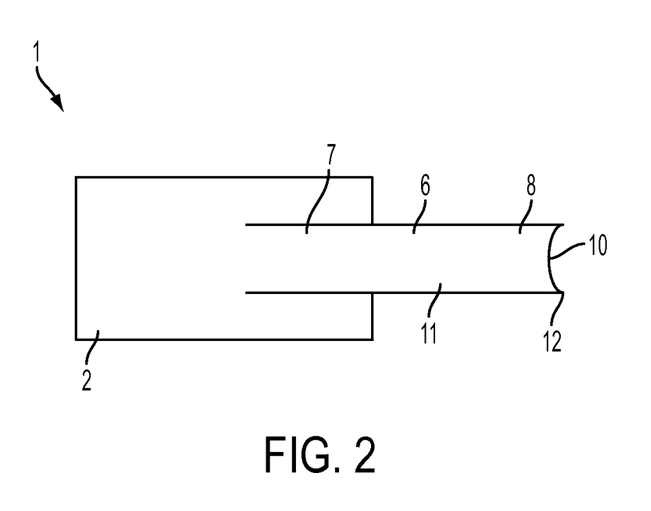
FIG. 2 is a top view of a ring device.
Figure 3:
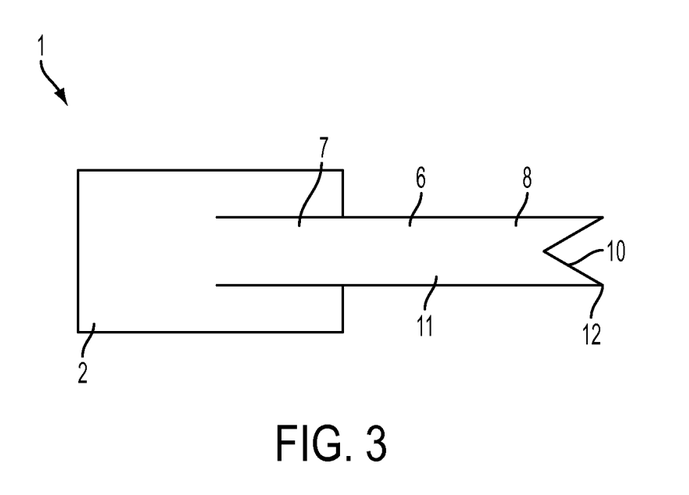
FIG. 3 is a top view of a ring device.
Figure 5:
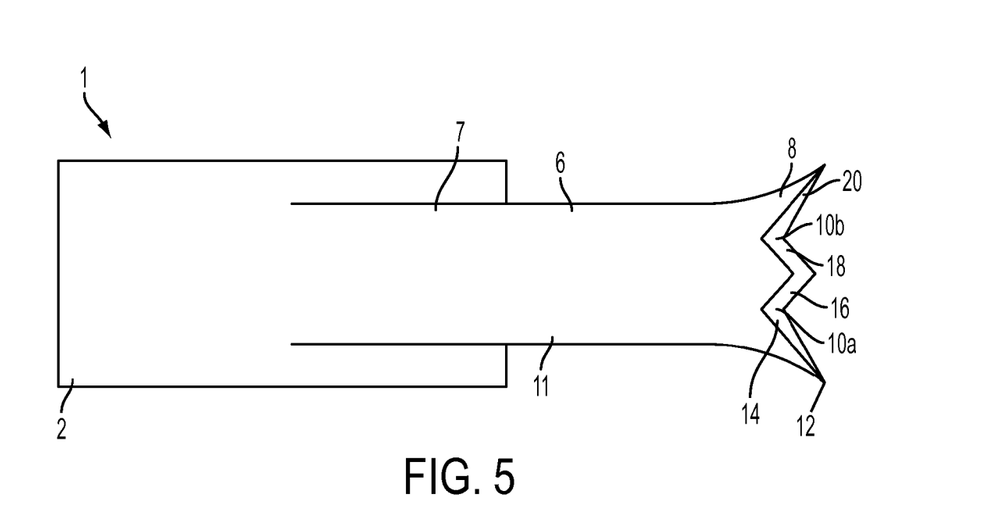
FIG. 5 is a top view of a ring device.
Figure 8:
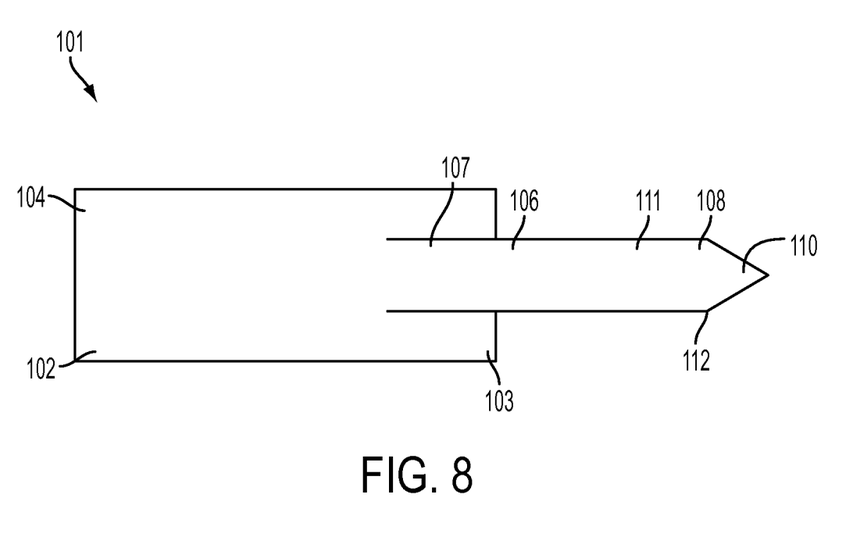
FIG. 8 is a top view of a ring device.

As shown in FIG. 2, a distal end 8 of the elongated portion 6 can include a notch 10. In this embodiment only one notch 10 is shown, but two or more notches could be formed in the distal end 8 of elongated portion 6. The notch 10 extends a distance towards the proximal end 7 of elongated portion 6 from a distal edge 12 of elongated portion 6 and can form an any suitable shape, such as, for example, a curved shape (as illustrated in FIG. 2), a V shape (as shown in FIG. 3) or a W shape (as shown in FIG. 5) in an upper surface 11 of elongated portion 6. In other embodiments, no notch is formed in distal edge 12 and the distal end 8 of elongated portion 6 can extend beyond distal edge 12, as shown in FIG. 8 and discussed below.

Figure 4:
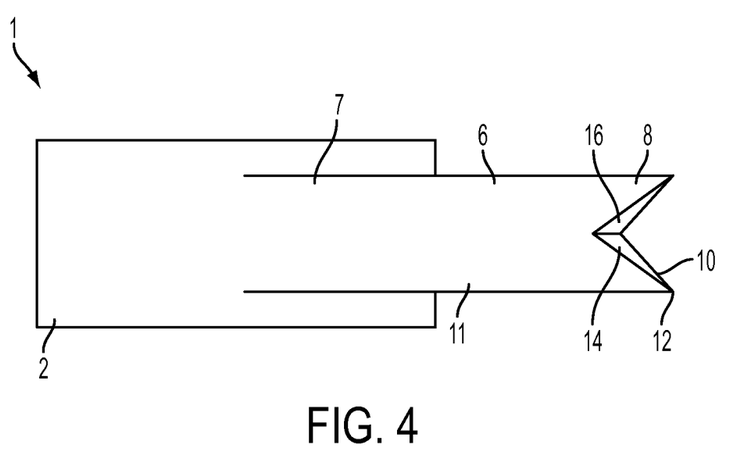
FIG. 4 is a top view of a ring device.

As shown in FIG. 3, a V shaped notch 10 is formed. Similarly to FIG. 2, FIG. 3 includes the notch 10 that is substantially perpendicular to the upper surface 11 of elongated portion 6. In other embodiments, as shown in FIG. 4, notch 10 can be formed at an angle, creating two notch faces 14 and 16. In this embodiment two notch faces are shown, but in other embodiments, one notch face or more than two can be formed. Notch 10 can be formed at any suitable angle from upper surface 11 of elongated portion 6, such as, for example about 30° from the upper surface 11 of elongated portion 6, as shown in FIG. 4. In other embodiments, notch 10 can be formed at angles of about 120° from the upper surface 11 of elongated portion 6.

In another embodiment shown in FIG. 5, four notch faces 14, 16, 18 and 20 can be formed by two notches 10*a* and 10*b*. In this embodiment, the four notch faces 14, 16, 18 and 20 are formed at an angle of about 30° from the upper surface 11 of elongated portion 6. Also as shown in FIG. 5, the distal end 8 of elongated portion 6 has an increased width as compared to the proximal end 7 of elongated portion 6. In other embodiments, the distal end 8 of elongated portion 6 can have a decreased width as compared to the proximal end 7 of elongated portion 6, or have the same width as compared to the proximal end 7 of elongated portion 6.

Figure 6:
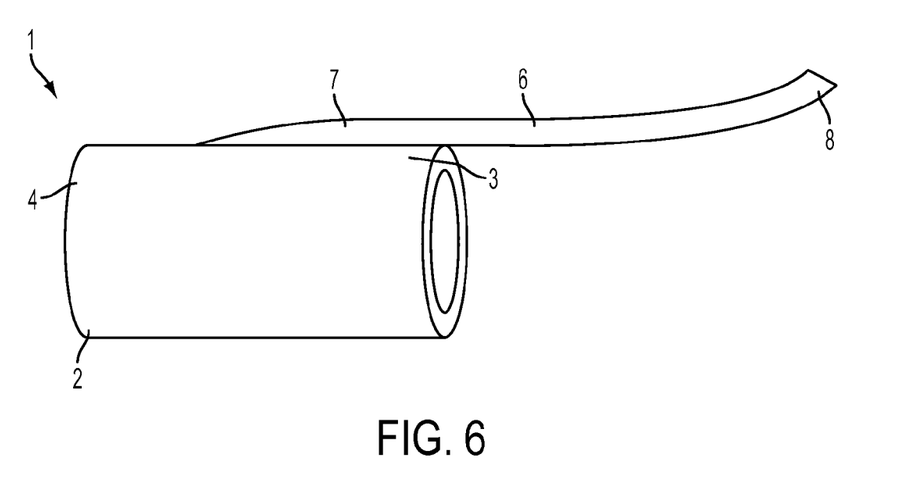
FIG. 6 is a plan view of a ring device.

As shown in FIG. 6, in some embodiments, the elongated portion 6 can be curved with respect to sheath 2. In other embodiments, elongated portion 6 can be formed at an angle as compared to sheath 2. In FIG. 6, the distal end 8 of elongated portion 6 is curved vertically above the distal end 3 of sheath 2. In other embodiments, distal end 8 of elongated portion could be curved vertically below the distal end 3 of sheath 2.

Figure 7:
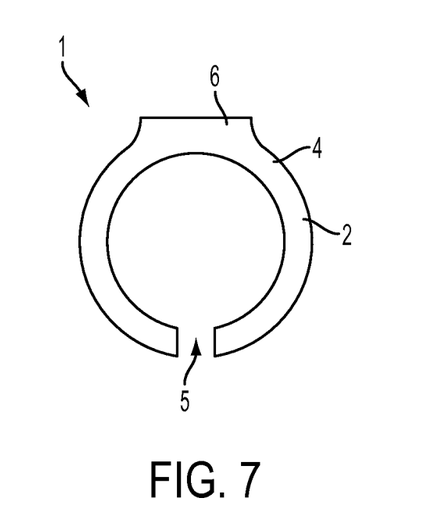
FIG. 7 is an axial view of a ring device.

FIG. 7 illustrates an axial view from proximal end 4 of sheath 2. In this embodiment elongated portion 6 is substantially flat and is seen as substantially rectangular from the proximal end 4 of sheath 2. In this embodiment, sheath 2 extends around a portion of a circumference, allowing for a gap 5 to be created.

Gap 5 can be located at any point along the circumference of sheath 2 other than where elongated portion 6 is operably connected to sheath 2. Gap 5 can be of any suitable width, and can be formed as two straight lines (as shown in FIG. 7) or can be formed of angled or curved lines. In other embodiments, sheath 2 extends around a whole circumference and no gap is formed.

As shown in FIG. 8, another embodiment of a ring device 101 is illustrated. FIG. 8 illustrates a top view of ring device 101. Ring device 101 includes sheath 102 and an elongated portion 106. The sheath 102 is configured to extend around a circumference, partially or totally, wherein the circumference is capable of extending around a portion of a user's finger. The portion of the user's finger can be any portion of any finger on the user's left or right hand. A proximal end 107 of elongated portion 106 is operably connected to a portion of the sheath 102. The proximal end 107 of elongated portion 106 can be operably connected to the sheath 102 in an area of a distal end 103 of the sheath 102 or the elongated portion 106 can be operably connected to the sheath 102 from the distal end 103 along the sheath 102 towards a proximal end 104 of the sheath 102.

Elongated portion 106 is shown as being substantially flat, but elongated portion 106 can be formed at an angle or be formed as part of a curve that extends vertically above or below the distal end 103 of sheath 102 and can be formed at any suitable thickness. Sheath 102 is shown as being substantially circular, but sheath 102 can be any other suitable shape that is capable of fitting around a portion of a user's finger, such as an eccentric shape or an oval shape, for example. Sheath 102 can also include a cover (not shown) over the opening in the distal end 103 of sheath 102, so that a user's finger does not protrude through sheath 102.

Elongated portion 106 and sheath 102 can be formed of any suitable material, such as, for example, a metal or plastic material.

A distal end 108 of the elongated portion 106 can include an extension 110. In this embodiment only one extension 110 is shown, but two or more extensions could be formed to extend beyond the distal end 108 of elongated portion 106. The extension 110 extends a distance away from the proximal end 107 of elongated portion 106 from a distal edge 112 of elongated portion 106 and can form an any suitable shape, such as, for example, a curved shape, a V shape (as shown) or a W shape.

In this embodiment, the extension 110 is formed substantially perpendicular to an upper surface 111 of elongated portion 106. In other embodiments, extension 110 can be formed at a suitable angle from upper surface 111 of elongated portion 106, such as, for example about 30° from the upper surface 111 of elongated portion 106. In other embodiments, extension 110 can be formed at angles of about 120° from the upper surface 111 of elongated portion 106.

EXAMPLE 1

The following example describes the use of one embodiment of the present disclosure. A user desires to remove some vegetation around their homes, for example, in their garden. The user picks up ring device 1, with a notch 10 as illustrated in FIG. 4. This particular embodiment of ring device 1, elongated portion 6 is curved with respect to sheath 2, as illustrated in FIG. 6. In this embodiment, the sheath 2 extends around a portion of a circumference, forming a gap 5, as illustrated in FIG. 7.

The user places their right index finger through the sheath 2 so that the upper surface 11 of elongated portion 6 faces the user's palm area when the index finger is bent. The sheath 2 slides onto the user's finger to about the second knuckle, so that the diameter of that portion of the user's finger is substantially the same as the circumference formed inside sheath 2, holding ring device 1 in place.

The user then goes to their garden and notices a plant that should be removed, such as crab grass. The user causes the distal end 8 of elongated portion 6 to enter the soil behind the plant at an angle so that the distal end 8, as it enters the soil, proceeds towards the center of the plant. Once the distal end 8 has been inserted a sufficient amount, the user pinches the plant with their thumb and pulls the ring device 1 out of the soil. The plant has now been removed from the soil.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A ring device, the device comprising:
a sheath, wherein the sheath extends partially around a circumference, creating a gap, the gap extending from a proximal end of the sheath to a distal end of the sheath, the circumference configured to extend around a portion of a user's finger, wherein the sheath is configured to allow the user's finger to extend past the distal end of the sheath; and
an elongated portion, wherein a proximal end of the elongated portion is operably connected to a portion of the sheath, and a distal end of the elongated portion comprises one or more notches formed in a distal edge of the distal end of the elongated portion, wherein the distal end of the elongated portion extends a distance beyond a distal end of the sheath and is curved vertically away from the circumference of the sheath, wherein the one or more notches form one or more notch faces, the one or more notch faces extending proximally from the distal end of the elongated portion forming an angle that is different than an angle of the distal end of the elongated portion and wherein the elongated portion extends substantially perpendicular to the circumference of the sheath, and wherein the elongated portion comprises a substantially flat portion and a substantially curved portion, wherein the substantially flat portion is distal to the substantially curved portion, wherein a portion of the one or more notch faces are formed in the substantially curved surface and the substantially curved surface is wider than the substantially flat portion.

2. The device of claim 1, wherein the distal end of the elongated portion comprises one notch and two notch faces.

3. The device of claim 1, wherein the distal end of the elongated portion comprises two notches and four notch faces.

4. The device of claim 1, wherein the ring device comprises a plastic material.

5. The device of claim 1, wherein the elongated portion is formed integrally with the sheath.

* * * * *